(12) United States Patent
Xu et al.

(10) Patent No.: US 9,080,851 B2
(45) Date of Patent: Jul. 14, 2015

(54) SIZE INSPECTION DEVICE

(71) Applicants: Fu Ding Electronical Technology (Jiashan) Co., Ltd., Zhejiang (CN); Hon Hai Precision Industry Co., Ltd., New Taipei (TW)

(72) Inventors: Jian-Hua Xu, Jiashan (CN); Jian-Qiang Lu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 171 days.

(21) Appl. No.: 13/947,107

(22) Filed: Jul. 22, 2013

(65) Prior Publication Data

US 2014/0026430 A1    Jan. 30, 2014

(30) Foreign Application Priority Data

Jul. 30, 2012  (CN) .................. 2012 2 0371200.4 U

(51) Int. Cl.
| | | |
|---|---|---|
| *G01B 5/02* | (2006.01) | |
| *G01B 5/14* | (2006.01) | |
| *G01B 3/34* | (2006.01) | |

(52) U.S. Cl.
CPC .. *G01B 5/14* (2013.01); *G01B 3/34* (2013.01); *G01B 5/02* (2013.01)

(58) Field of Classification Search
CPC ............... G01B 5/14; G01B 5/02; G01B 7/02
USPC ........................................... 33/549, 551, 552
See application file for complete search history.

(56) References Cited

U.S. PATENT DOCUMENTS

| 4,221,053 | A | * | 9/1980 | Bobel et al. ..................... 33/552 |
| 5,014,440 | A | * | 5/1991 | Lessi et al. ...................... 33/557 |
| 5,347,471 | A | * | 9/1994 | Simon et al. ..................... 702/81 |
| 5,426,862 | A | * | 6/1995 | Ham et al. ....................... 33/548 |
| 5,687,487 | A | * | 11/1997 | Johnson ..................... 33/501.02 |
| 6,460,264 | B1 | * | 10/2002 | Bos et al. ......................... 33/549 |
| 6,470,587 | B1 | * | 10/2002 | Cunningham et al. .......... 33/557 |
| 7,587,836 | B2 | * | 9/2009 | Zhang et al. ..................... 33/534 |
| 7,748,133 | B2 | * | 7/2010 | Liu ................................... 33/549 |
| 7,779,550 | B2 | * | 8/2010 | Li et al. ............................ 33/533 |
| 7,779,551 | B2 | * | 8/2010 | Zhang .............................. 33/533 |
| 7,779,552 | B1 | * | 8/2010 | Zhang .............................. 33/549 |
| 7,984,561 | B2 | * | 7/2011 | Li et al. ........................... 33/551 |

* cited by examiner

*Primary Examiner* — Christopher Fulton
(74) *Attorney, Agent, or Firm* — Novak Druce Connolly Bove + Quigg LLP

(57) ABSTRACT

A size inspection device includes a detecting platform, a positioning assembly, four first detecting assemblies, four second detecting assemblies, a third detecting assembly, and a controller. The detecting platform includes a mounting plate. The positioning assembly is detachably mounted on the mounting plate for holding the workpiece on the detecting platform. The controller is electronically connected to the first detecting assemblies, the second detecting assemblies, and the third detecting assembly. The four first detecting assemblies and the four second detecting assemblies are slidably mounted on the mounting plate and are capable of obtaining a first moving distance and a second moving distance respectively. The third detecting assembly is mounted on the mounting plate and is capable of obtaining a third moving distance. The controller obtains the moving distances and determines whether or not the workpiece is of passing or failing quality.

14 Claims, 5 Drawing Sheets

SIZE INSPECTION DEVICE

BACKGROUND

1. Technical Field

The present disclosure relates to an inspection device, and particularly to a device for detecting and inspecting size dimensions of a workpiece.

2. Description of Related Art

When determining or assessing whether if various size dimensions of a workpiece are within the preset quality specification tolerance, so as to be considered as qualified or not, a detecting and inspection device, such as a micrometer caliper, is employed to measure a length value, a width value, and an depth value of the workpiece. The above-mentioned physical parameters are compared to a preset standard range or quality specification tolerance to determine whether or not the workpiece is of sufficient quality to pass inspection. However, obtaining the above-mentioned parameters by using the micrometer caliper is time consuming, thereby reducing an efficiency of the measuring procedure.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
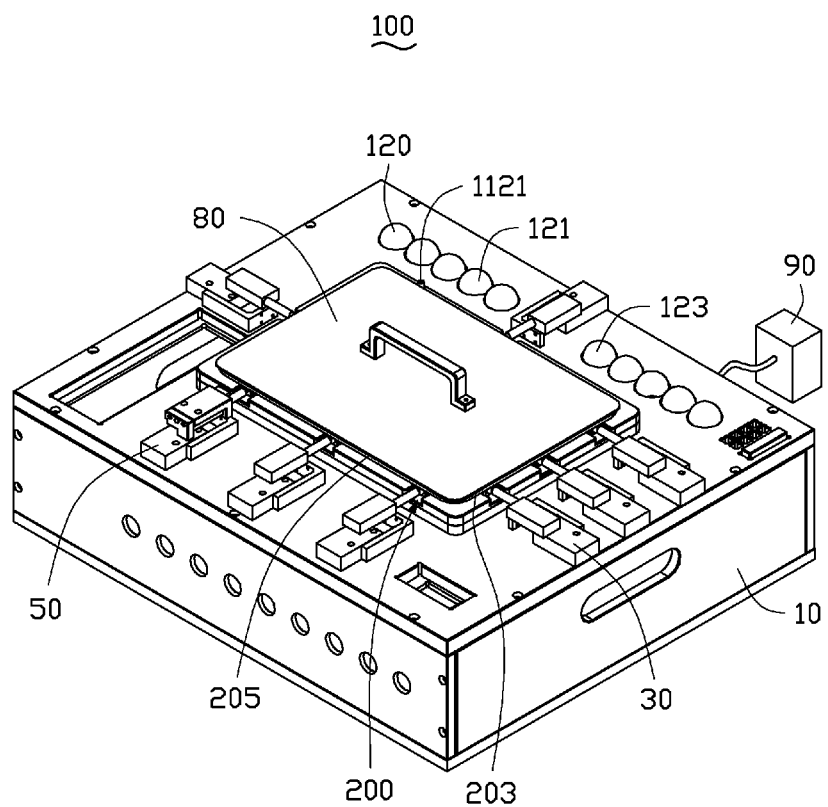
FIG. 1 is an isometric view of an embodiment of a size inspection device, including a positioning assembly and four first detecting assemblies.
Figure 2:
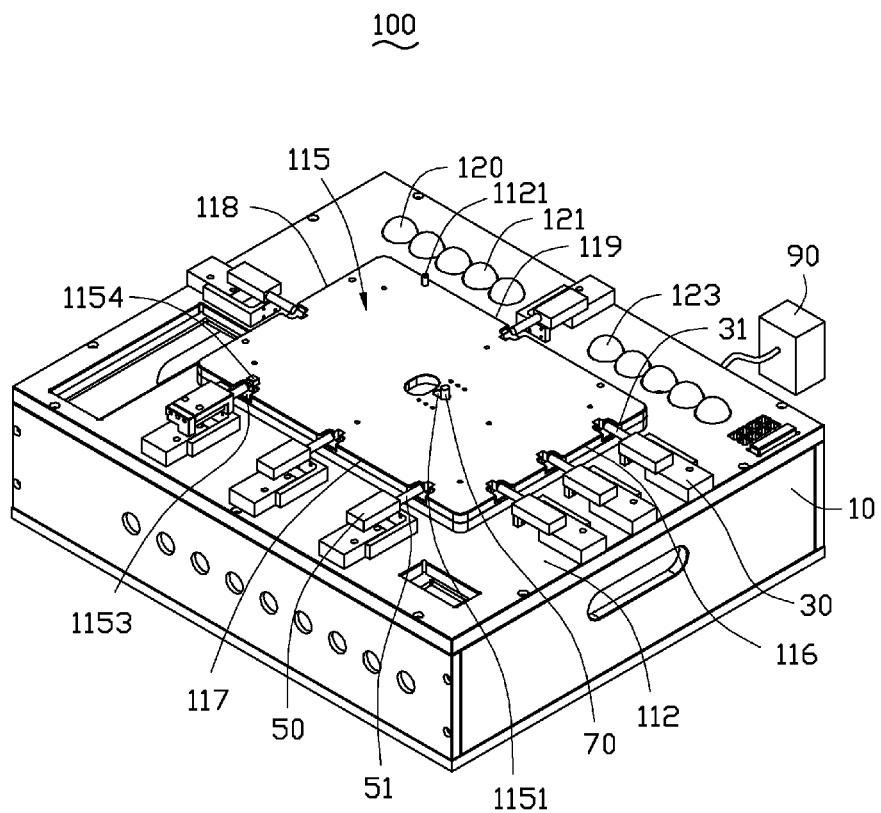
FIG. 2 is an isometric view of the size inspection device of FIG. 1, with the positioning assembly removed.

Referring to FIGS. 1 and 2, an embodiment of a size inspection device 100 is employed to measure various size values of a workpiece 200 automatically. The workpiece 200 defines a receiving groove 202 (see FIG. 5) in a bottom thereof. The size inspection device 100 obtains a length value and a width value of the workpiece 200, and a depth value of the receiving groove 202, and compares the above-mentioned measurement values to a preset standard range or quality specification tolerance to determine whether or not the workpiece 200 has passed quality inspection. The workpiece 200 includes a bottom wall 201 (see FIG. 5), two first sidewalls 203, and two second sidewalls 205. The receiving groove 202 is defined in the bottom wall 201 of the workpiece 200. The two first sidewalls 203 and the two second sidewalls 205 extend substantially perpendicularly from a peripheral edge of the bottom wall 201. Each first sidewall 203 connects substantially perpendicularly to the two second walls 205. The length measurement is defined as a distance value between the two first sidewalls 203. The width measurement is defined as a distance value between the two second sidewalls 205, and the depth measurement is defined as a distance value between the bottom wall 201 and a bottom of the receiving groove 202. The size inspection device 100 includes a detecting platform 10, four first detecting assemblies 30, four second detecting assemblies 50, a third detecting assembly 70, and a controller 90.

Figure 3:
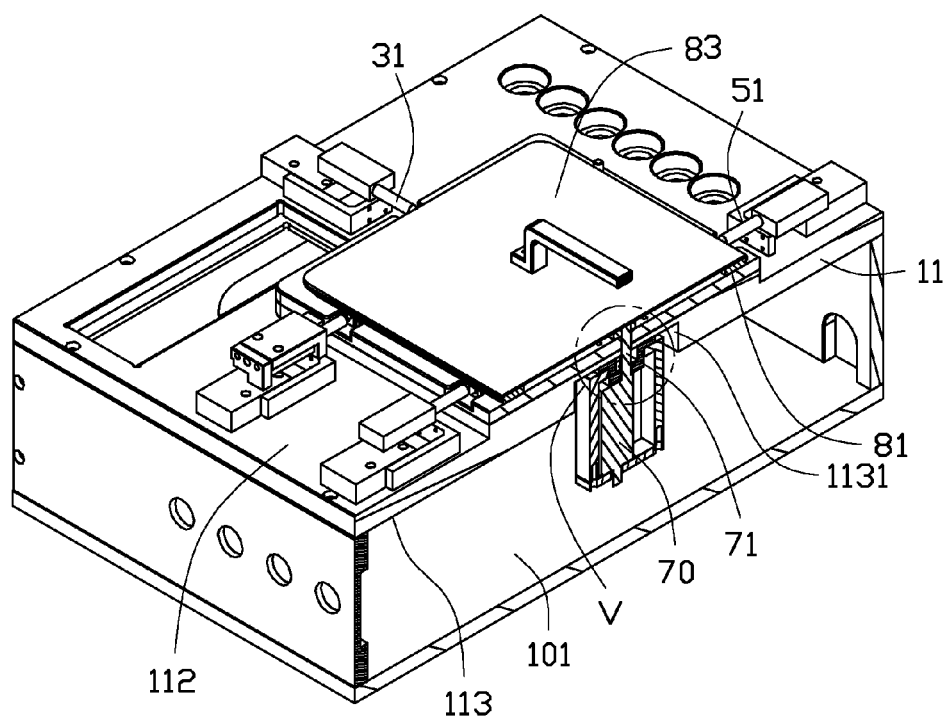
FIG. 3 is a cutout view of the size inspection device of FIG. 1.

Also referring to FIG. 3, the detecting platform 10 is substantially a hollow cubic shape, and defines a receiving chamber 101 therein. The detecting platform 10 includes a mounting plate 11 sealing the receiving chamber 101. The mounting plate 11 is substantially a rectangular plate, and includes a first surface 112 and a second surface 113 opposite to the first surface 112. The second surface 113 faces the receiving chamber 101. A mounting portion 115 protrudes upward from a middle portion of the first surface 112. The mounting portion 115 is a substantially rectangular plate, and defines a detecting hole 1151 communicating with the receiving chamber 101. The mounting portion 115 includes a first side surface 116, a second side surface 117, a third side surface 118, and a fourth side surface 119 connecting end to end in that order, respectively. The first side surface 116 and the third side surface 118 are parallel to each other. The second side surface 117 and the fourth side surface 119 are parallel to each other. The first side surface 116 and the third side surface 118 are connected substantially perpendicularly to the second side surface 117 and the fourth side surface 119. Each of the first side surface 116, the second side surface 117, the third side surface 118, and the fourth side surface 119 defines at least one detecting groove 1153 formed in an edge thereof adjacent to a top surface of the mounting portion 115. A positioning protrusion 1154 protrudes from a bottom portion of each detecting groove 1153.

In the illustrated embodiment, the first side surface 116 and the second side surface 117 each defines three detecting grooves 1153, while the third side surface 118 and the fourth side surface 119 each define one detecting groove 1153. A positioning portion 1121 protrudes from the first surface 112 of the mounting plate 11 and is located adjacent to the fourth side surface 119 to prevent the workpiece 200 from displacement. The first surface 112 is equipped with a plurality of first indicating lamps 120, a plurality of second indicating lamps 121, and a plurality of third indicating lamps 123. The plurality of first indicating lamps 120, the plurality of second indicating lamps 121, and the plurality of third indicating lamps 123 are arranged along a line parallel to and adjacent to the fourth side surface 119 for indicating whether or not the length measurement value, the width measurement value, and the depth measurement value of the receiving groove 202 of the workpiece 200 are of adequate quality (i.e. judged by pass or fail inspection result). The second surface 113 of the mounting plate 11 defines a mounting groove 1131 corresponding to the detecting hole 1151. The detecting hole 1151 communicates with the mounting groove 1131.

The controller 90 is electronically connected to the plurality of first indicating lamps 120, the plurality of second indicating lamps 121, and the plurality of third indicating lamps 123. The controller 90 is programmed with preset standard value ranges (quality specification tolerance data) of the length measurement value, the width measurement value, and the depth measurement value.

Figure 4:
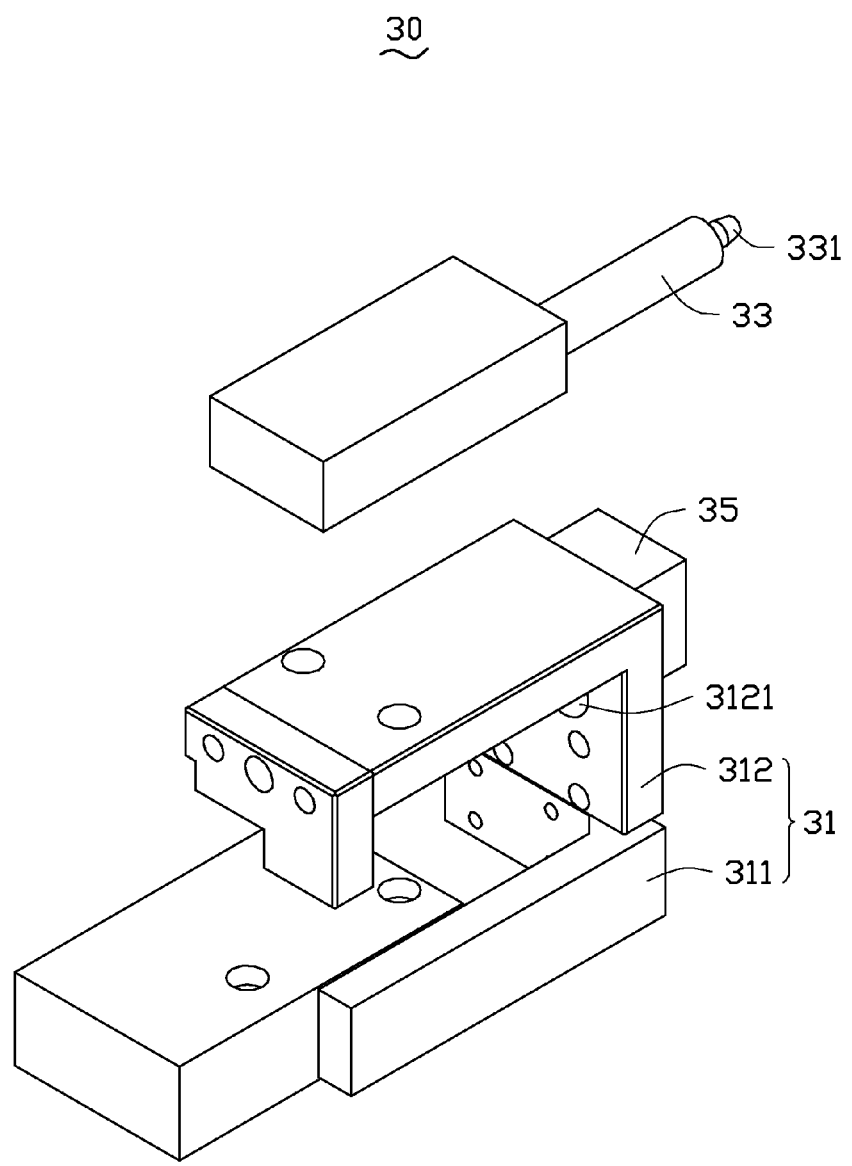
FIG. 4 is an exploded, isometric view of one first detecting assembly of the size inspection device of FIG. 1.

In the embodiment, the first detecting assemblies 30, the second detecting assemblies 50, and the third detecting assemblies 70 are substantially the same, so only details of the first detecting assemblies 30 are described hereinafter. The four first detecting assemblies 30 are mounted on the first surface 112 of the mounting plate 11. Three first detecting assemblies 30 are located adjacent to the mounting portion 115 and adjacent to the first side surface 116, while one first detecting assembly 30 is located adjacent to the mounting portion 115 and adjacent to the third side surface 118. Also referring to FIG. 4, the first detecting assembly 30 includes a driving member 31, a moving member 33, and a sensor 35. The driving member 31 is mounted on the first surface 112 adjacent to the mounting portion 115. The driving member 31 is connected to an external air source, and configured to drive the moving member 33. The driving member 31 includes a sliding block 311 and a resisting block 312 fixed to the sliding block 311. The resisting block 312 defines an extending hole 3121. The moving member 33 is slidably received in the driving member 31, and partially extends out of the extending hole 3121. The moving member 33 includes a positioning pin 331 on an end of the moving member 33. The sensor 35 is mounted on the resisting block 312, and is electronically connected to the controller 90. The plurality of first indicating lamps 120 are turned on during the moving distance measurement. The moving member 33 is driven by the driving member 31 to move toward the first sidewalls 203, such that the positioning pin 331 resists each of the first sidewalls 203, thereby recording a first moving distance of the positioning pin 331. The sensor 35 detects and sends the moving distance to the controller 90, and the controller 90 compares the moving distance to the preset standard value range. When the length measurement value falls out of (out of bound of) the preset standard value range, the controller 90 turns off the first indicating lamps 120.

The four second detecting assemblies 50 are mounted on the first surface 112 and are electrically connected to the controller 90. Three of the second detecting assemblies 50 are located adjacent to the second side surface 117, while one second detecting assembly 50 is located adjacent to the fourth side surface 119. A plurality of second moving members 51 (see FIG. 2) of the second detecting assemblies 50 move toward the workpiece 200 respectively, and resist the two second side walls 205, thereby recording a second moving distance, so as to obtain a width measurement value of the workpiece 200 according to the second moving distance. The controller 90 compares the width measurement values detected by the four second detecting assemblies 50 to the preset standard value range. If the width measurement value falls out of (out of bound of) the preset standard value range, the plurality of second indicating lamps 121 are turned off.

Referring to FIG. 3 again, the third detecting assembly 70 is received in the receiving chamber 101 and is slidably mounted on a bottom surface of the mounting groove 1131. The third detecting assembly 70 is electrically connected to the controller 90. The third detecting assembly 70 includes a third moving member 71 extending through the detecting hole 1151. The third moving member 71 moves from the bottom wall 201 to the bottom of the receiving groove 202 of the workpiece 200. The third detecting assembly 70 records a third moving distance between the bottom wall 201 and the bottom of the receiving groove 202, so as to obtain a depth measurement value of the receiving groove 202. According to the third moving distance, the controller 90 compares the depth measurement value detected and obtained by the third detecting assembly 70 to the preset standard value range. If the depth measurement value falls out of the preset standard value range, the plurality of third indicating lamps 123 are turned off.

Figure 5:
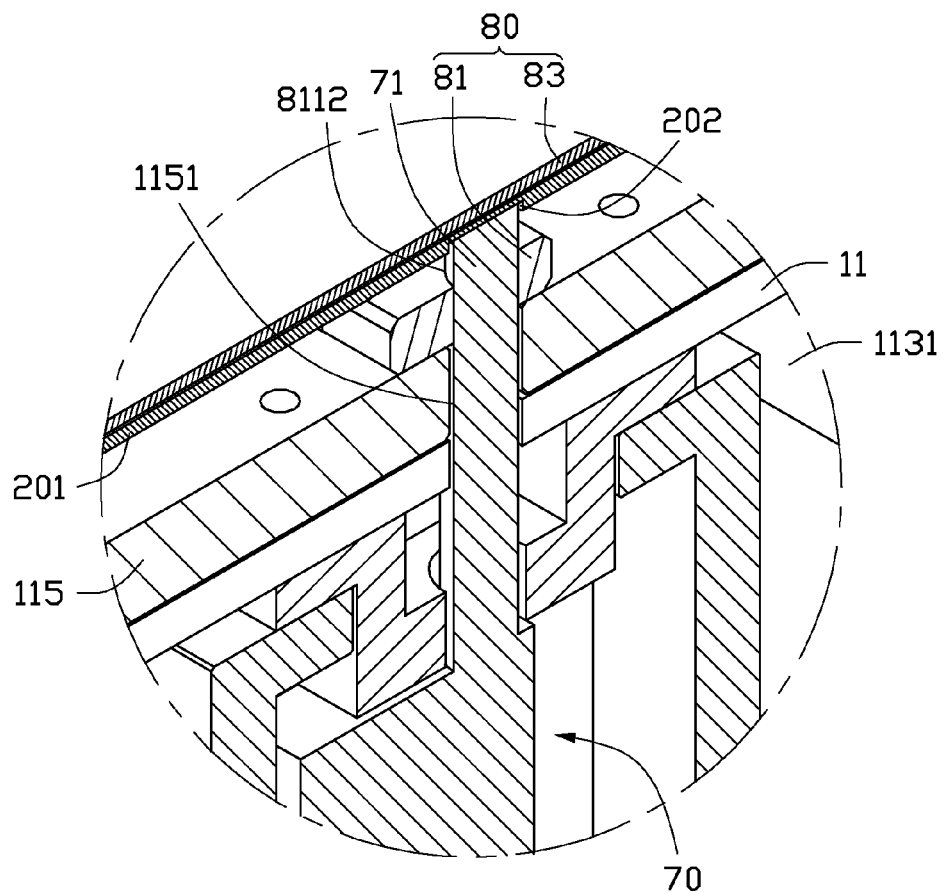
FIG. 5 is an enlarged view of a circled portion V of FIG. 3.

Also referring to FIG. 5, the size inspection device 100 further employs a positioning assembly 80 to position the workpiece 200. The positioning assembly 80 includes a positioning frame 81 and a positioning cover 83 detachably assembled together to clamp the workpiece 200 therebetween. The positioning frame 81 has a shape and size corresponding to the workpiece 200. The plurality of positioning protrusions 1154 extends through the positioning frame 81 to hold the positioning frame 81 on the detecting platform 10.

The positioning frame 81 defines a through hole 8112 in a middle portion thereof communicating with the detecting hole 1151 for allowing the third moving member 71 to extend through to contact the bottom wall 201 of the workpiece 200. The positioning cover 83 shields the workpiece 200 to prevent the workpiece 200 from displacement.

When in use, the workpiece 200 is held on the positioning frame 81, and the positioning cover 83 is detachably placed upon the workpiece 200. The positioning assembly 80 is mounted on the mounting portion 115. The plurality of first detecting assemblies 30, the plurality of second detecting assemblies 50, and the third detecting assembly 70 each measures a moving distance to obtaining the length measurement value, the width measurement value, and the depth measurement value of the workpiece 200, respectively. The controller 90 receives the length measurement value, the width measurement value of the workpiece 200, and the depth measurement value of the receiving groove 202 from the plurality of first detecting assemblies 30, the plurality of second detecting assemblies 50, and the third detecting assembly 70. The controller 90 compares the length measurement value, the width measurement value, and the depth measurement value to the preset standard value range, and determines whether or not the workpiece 200 is pass or fail based on the size inspection results.

The size inspection device 100 employs the plurality of first detecting assemblies 30, the plurality of second detecting assemblies 50, and the third detecting assembly 70 to measure the length measurement value, the width measurement value of the workpiece 200, and the depth measurement value of the receiving groove 202 simultaneously, which saves time and increases efficiency.

The number of the first detecting assemblies 30, the second detecting assemblies 50, and the third detecting assemblies 70 may be changed according to a requirement of the size inspection device 100. The number of the first indicating lamps 120, the second indicating lamps 121, and the third indicating lamps 123 is equal to the number of the first detecting assemblies 30, the second detecting assemblies 50, and the third detecting assemblies 70, respectively.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A size inspection device for detecting and inspecting sizes of a workpiece with a receiving groove automatically, comprising:

a detecting platform comprising a mounting plate;
a positioning assembly detachably mounted on the mounting plate for holding the workpiece on the detecting platform;
at least one first detecting assembly;
at least one second detecting assembly;
at least one third detecting assembly; and
a controller electrically connected to the at least one first detecting assembly, the at least one second detecting assembly, and the at least one third detecting assembly;
wherein the at least one first detecting assembly, and the at least one second detecting assembly are slidably mounted on the mounting plate surrounding the positioning assembly, a sliding direction of the at least one first detecting assembly is perpendicular to a sliding direction of the at least one second detecting assembly, the at least one first detecting assembly and the at least one second detecting assembly are capable of moving toward the positioning assembly and resisting corresponding sidewalls of the workpiece, thereby obtaining a first moving distance and a second moving distance, respectively, the at least one first detecting assembly and the at least one second detecting assembly send the first and the second moving distances to the controller, the at least one third detecting assembly is mounted on the mounting plate opposite to the positioning assembly, and capable of moving through the mounting plate and resisting a bottom of the workpiece and a bottom of the receiving groove, thereby obtaining a third moving distance between the bottom wall and the bottom of the receiving groove, the at least one third detecting assembly sends the third moving distance to the controller, the controller compares the first, the second, and the third moving distances to preset standard value ranges, to determine whether the size measurements of the workpiece have passed or failed size inspection.

2. The size inspection device of claim 1, wherein the detecting platform is equipped with at least one first indicating lamp, at least one second indicating lamp, and at least one third indicating lamp, the at least one first indicating lamp, the at least one second indicating lamp, and the at least one third indicating lamp are located adjacent to the positioning assembly and electrically connected to the controller for indicating whether the size measurements of the workpiece are passing or failing size inspection, according to an order of the controller.

3. The size inspection device of claim 1, wherein the mounting plate comprises a first surface and a second surface opposite to the first surface, the positioning assembly is assembled to the first surface, the at least one third detecting assembly is assembled to the second surface, the at least one first detecting assembly comprises a driving member, a first moving member, and a sensor, the driving member is mounted on the first surface, the first moving member is partially received in the driving member and driven by the driving member to move toward the sidewall of the workpiece, the sensor is mounted on the driving member and electronically connected to the controller, the sensor is capable of detecting the first moving distance of the first moving member and sends the first moving distance to the controller.

4. The size inspection device of claim 3, wherein the second surface defines a mounting groove thereon, the at least one third detecting assembly is slidably mounted on a bottom surface of the mounting groove.

5. The size inspection device of claim 4, wherein the mounting plate defines a detecting hole thereon extending through the first surface and the second surface thereof, the number of the at least one third detecting assembly is one, each third detecting assembly comprises a third moving member extending through the detecting hole, and resisting a bottom of the workpiece.

6. The size inspection device of claim 5, wherein the positioning assembly comprises a positioning frame and a positioning cover detachably assembled together to clamp the workpiece therebetween, the positioning frame defines a through hole in a middle portion thereof communicating with the detecting hole, for the third moving member extending therethrough to contact the bottom of the workpiece, the positioning cover shields the workpiece to prevent the workpiece from displacement.

7. The size inspection device of claim 6, wherein the mounting plate comprises a mounting portion, the detecting hole is defined on the mounting portion, the mounting portion defines at least two detecting grooves at a peripheral edge thereof corresponding to the at least one first detecting assembly and the at least one second detecting assembly, a positioning protrusion protrudes from a bottom of each detecting groove, and the at least two positioning protrusions extend through the positioning frame to hold the positioning frame on the detecting platform.

8. A size inspection device for detecting and inspecting sizes of a workpiece with a receiving groove automatically, comprising:
a detecting platform comprising a mounting plate;
a positioning assembly detachably mounted on a top of the mounting plate for holding the workpiece on the detecting platform;
at least one first detecting assembly;
at least one second detecting assembly;
at least one third detecting assembly; and
a controller electrically connected to the at least one first detecting assembly, the at least one second detecting assembly, and the at least one third detecting assembly;
wherein the at least one first detecting assembly, and the at least one second detecting assembly are slidably mounted on a top of the mounting plate adjacent to the positioning assembly, the at least one first detecting assembly and the at least one second detecting assembly are capable of moving toward the positioning assembly and resisting a periphery of the workpiece, thereby obtaining a length measurement value and a width measurement value, respectively, the at least one first detecting assembly and the at least one second detecting assembly send the length and the width measurement values to the controller, the third detecting assembly is mounted on a bottom of the mounting plate, and capable of moving through the mounting plate and resisting a bottom of the workpiece and a bottom of the receiving groove, thereby obtaining a depth measurement value of the receiving groove, the third detecting assembly sends the depth measurement value to the controller, the controller compares the length measurement value, the width measurement value, and the depth measurement value to preset standard value ranges, to determine whether or not the workpiece has passed size quality inspection.

9. The size inspection device of claim 8, wherein the detecting platform is equipped with at least one first indicating lamp, at least one second indicating lamp, and at least one third indicating lamp, the at least one first indicating lamp, the at least one second indicating lamp, and the at least one third indicating lamp are located adjacent to the positioning assembly and electrically connected to the controller for indicating whether the length measurement value, the width measurement value, and the depth measurement value of the workpiece are of passing or failing quality according to results of the controller.

10. The size inspection device of claim 8, wherein the mounting plate comprises a first surface and a second surface opposite to the first surface, the positioning assembly is assembled to the first surface, the at least one third detecting assembly is assembled to the second surface, the at least one first detecting assembly comprises a driving member, a first moving member, and a sensor, the driving member is mounted on the first surface, the first moving member is partially receiving in the driving member and driven by the driving member to move toward the side wall of the workpiece, the sensor is mounted on the driving member and electronically connected to the controller and located above the first moving member, the sensor is capable of detecting the length measurement value of the workpiece and sends it to the controller.

11. The size inspection device of claim 10, wherein the second surface defines a mounting groove thereon, the at least one third detecting assembly is slidably mounted on a bottom surface of the mounting groove.

12. The size inspection device of claim 11, wherein the mounting plate defines a detecting hole thereon extending through the first surface and the second surface thereof, the number of the at least one third detecting assembly is one, each third detecting assembly comprises a third moving member extending through the detecting hole, and resisting a bottom of the workpiece.

13. The size inspection device of claim 12, wherein the positioning assembly comprises a positioning frame and a positioning cover detachably assembled together to clamp the workpiece therebetween, the positioning frame defines a through hole in a middle portion thereof communicating with the detecting hole, for the third moving member extending therethrough to contact the bottom of the workpiece, the positioning cover shields the workpiece to prevent the workpiece from displacement.

14. The size inspection device of claim 13, wherein the mounting plate comprises a mounting portion, the detecting hole is defined on the mounting portion, the mounting portion defines at least two detecting grooves at a peripheral edge thereof corresponding to the at least one first detecting assembly and the at least one second detecting assembly, a positioning protrusion protrudes from a bottom of each detecting groove, and the at least two positioning protrusions extend through the positioning frame to hold the positioning frame on the detecting platform.

* * * * *